INVENTOR.
ROBERT W. QUIRK 2,967,249
Patented Jan. 3, 1961

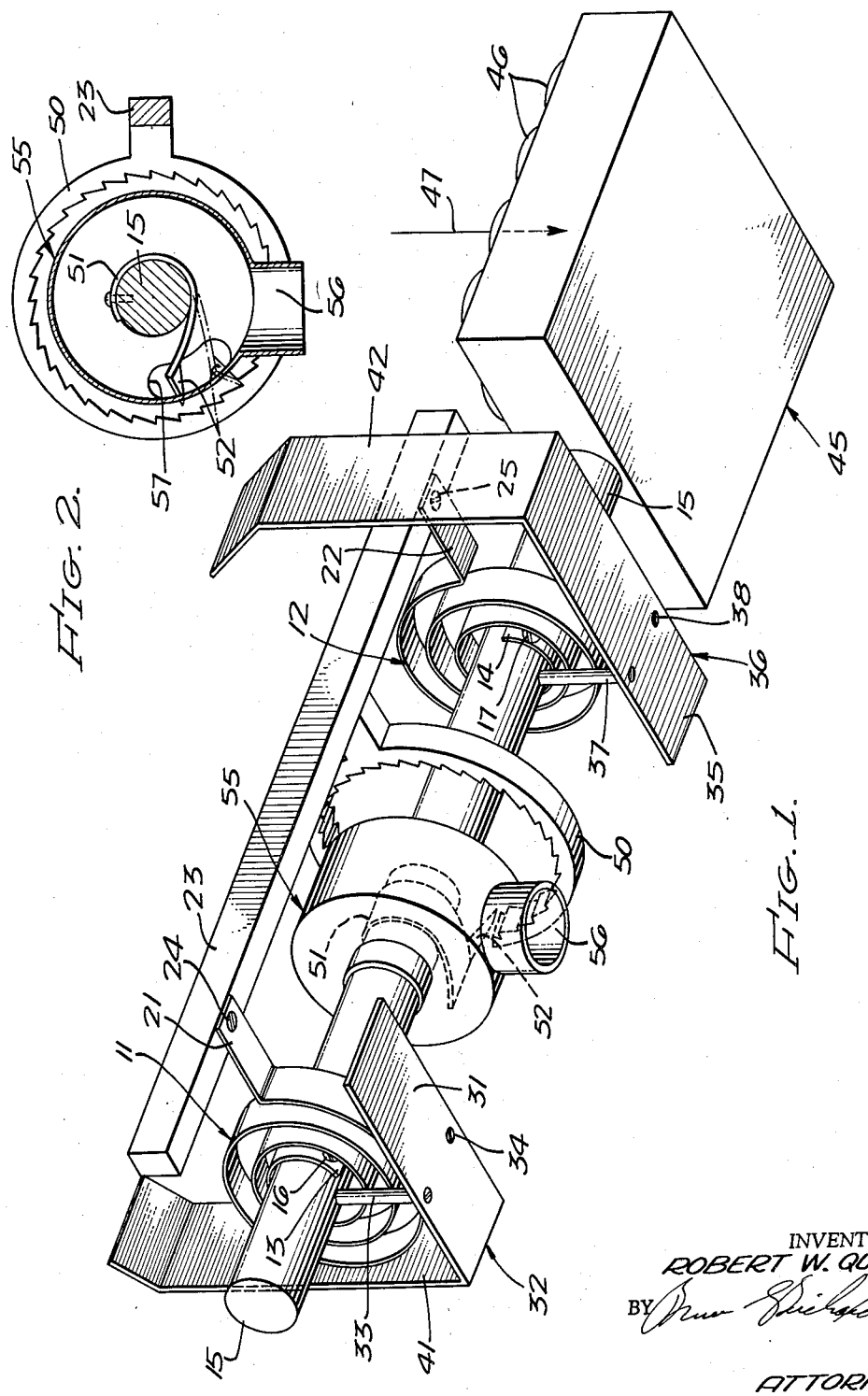

2,967,249

SERVOMECHANISM FOR TRACKING A HEAT SOURCE

Robert W. Quirk, Los Angeles, Calif., assignor to Hoffman Electronics Corporation, a corporation of California Filed Jan. 27, 1959, Ser. No. 789,330

10 Claims. (Cl. 250—215)

The present invention relates to servomechanisms, and more particularly to servomechanisms for tracking a heat source.

In the solar energy field, in order to expose solar cells to sunlight in such a way as to obtain the maximum energy from the sun, it is frequently desirable to maintain the incident sunlight perpendicular to the solar cells by tracking the sun as the earth rotates or as the solar device changes position, in the case of a solar device that is not stationary with respect to the earth. The prior art shows devices to achieve this objective, but such devices utilize complicated and expensive photo indicators and electric motor systems and are accordingly unsatisfactory.

It is an object of the present invention, therefore, to provide a servomechanism for tracking a heat source.

It is another object of the present invention to provide a simple, low cost, and reliable apparatus for tracking the sun.

According to the preferred embodiment of the present invention, two bimetallic strips are affixed to, and spiraled oppositely about, a shaft so as to form two springs. The free end of each spring is affixed to a base mount. The springs are the sole support of the shaft and tend to rotate the shaft in opposite directions. Each spring is provided with a shield such that if energy from a heat source reaches the shaft from a particular direction, the bimetallic springs will be equally exposed, and the greater the angle of incidence of the energy with respect to that particular direction, the more unequally will the two bimetallic springs be exposed. Unequal exposure will cause one bimetallic spring to contract, causing the shaft to rotate in a direction towards the heat source until both bimetallic springs are once again equally exposed. Thus, solar cells mounted on the shaft will track the heat source.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is an isometric view of a sun-tracking servomechanism showing the preferred embodiment of the present invention.

Figure 2 is a detailed view of the third motivating element of Figure 1.

Figure 3:
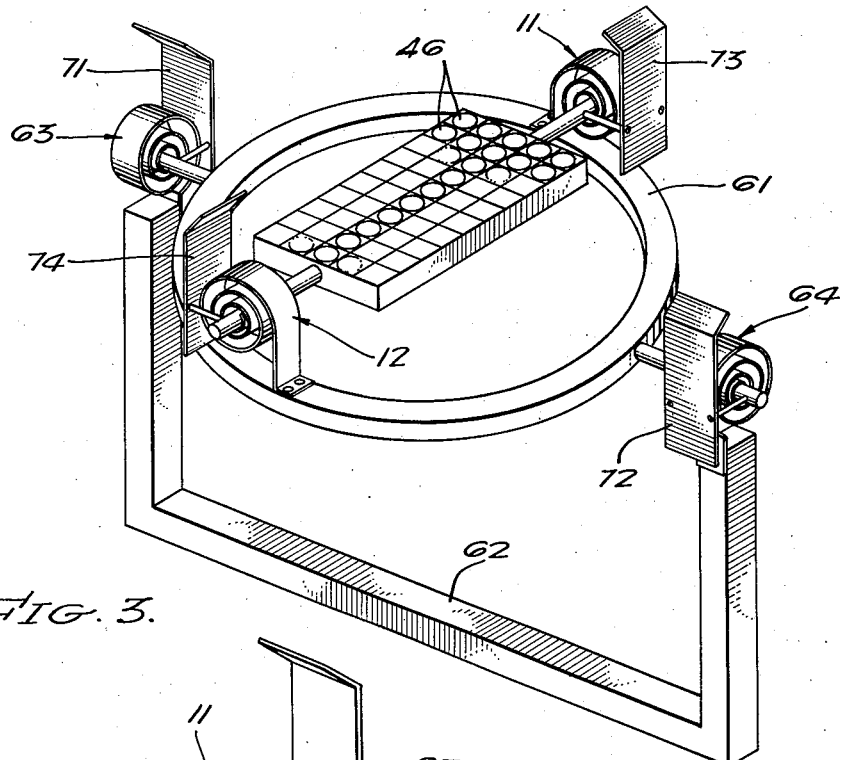
Figure 3 is an isometric view of a second embodiment of the present invention.

Referring now to the drawings, in Figure 1, bimetallic springs 11 and 12 are mounted at ends 13 and 14, respectively, to shaft 15 by screws 16 and 17, respectively. Bimetallic springs 11 and 12 are mounted at ends 21 and 22, respectively, to base mount 23 by screws 24 and 25, respectively. Bimetallic spring 11 is wound counterclockwise around shaft 15 and bimetallic spring 12 is wound clockwise around shaft 15. Side 31 of shield 32 is mounted to shaft 15 by studs 33 and 34. Side 35 of shield 36 is mounted to shaft 15 by studs 37 and 38. Sides 31 and 35 are parallel to each other and on the same side of shaft 15. Side 41 of shield 32 and side 42 of shield 36 are parallel to each other and on opposite sides of shaft 15, side 42 being on the base mount side of shaft 15. Shields 32 and 36 shield bimetallic springs 11 and 12, respectively, from the sun. Shaft 15 is connected to panel 45, which lies in a plane perpendicular to the planes of sides 41 and 42. Panel 45 contains solar cells 46 oriented so as to be sensititve to light coming from the direction shown by arrow 47.

The operation of the servomechanism will now be described. Bimetallic springs 11 and 12, being wound about shaft 15 in opposite directions, oppose each other. That is, bimetallic spring 11 tends to rotate shaft 15 counterclockwise, while bimetallic spring 12 tends to rotate shaft 15 clockwise. Increasing or decreasing the temperature of both bimetallic springs an equal amount does not result in any movement of shaft 15. Thus, when the sun shines from the front null direction indicated by arrow 47, bimetallic springs 11 and 12 will be equally exposed to the sunlight, and no movement will occur. If base mount 23 is mounted on the surface of the earth and the earth rotates, or if base mount 23 is mounted to a moving balloon or earth satellite, when the sun shines from a direction other than that indicated by arrow 47, shield 32 will cast a shadow upon bimetallic spring 11, or shield 36 will cast a shadow upon bimetallic spring 12, depending upon the direction from which the sun is shining. The bimetallic spring in the shadow will cool and will start to contract, causing shaft 15 to rotate in a direction towards the sun until bimetallic springs 11 and 12 are once again equally exposed. Thus, panel 45, being mounted on shaft 15, will be caused to track the sun.

One contingency to take precautions against is the situation that could result if the sun should shine from the rear null direction, that is, from a direction 180° out of phase with the front null direction. In such a situation bimetallic springs 11 and 12 would be equally exposed and there would be no movement of shaft 15, although panel 45 would not be properly facing the sun. In order to remove shaft 15 from the rear null position, a third motivating element is utilized. Ratchet ring 50 is connected to base mount 23. Bimetallic strip 51 is connected at one end thereof to shaft 15. The other end of bimetallic strip 51 is connected to tip 52. Chamber 55 is connected to shaft 15 and completely encloses bimetallic strip 51 except for two openings, which will now be described along with the operation of bimetallic strip 51.

Figure 2 shows in detail how bimetallic strip 51 contacts ratchet ring 50, by means of a cross-section taken through port 56 and perpendicular to shaft 15. When shaft 15 is in any position other than the rear null position, port 56 will permit only an insignificant amount of sunlight to enter chamber 55, and bimetallic strip 51 will be cool and contracted. When shaft 15 is in the rear null position, port 56 will permit sunlight to enter chamber 55, and bimetallic strip 51 will heat up and expand. When bimetallic strip 51 is contracted, it makes no contact with ratchet ring 50. But, when bimetallic strip 51 expands, tip 52 makes contact through opening 57 with ratchet ring 50 and pushes against it, as shown in broken lines. Since ratchet ring 50 is connected to base mount 23, shaft 15 is forced to rotate, removing port 56 from the sunlight and allowing bimetallic strip 51 to contract. When shaft 15 is forced to rotate, bimetallic springs 11 and 12 are unequally exposed to the sunlight, and they start operating as previously described until the front null position is reached.

Figure 3 shows a second embodiment of the sun-tracking servomechanism of the present invention. Gimbal 61 replaces base mount 23 of Figure 1 and a second degree of freedom is obtained by connecting gimbal 61 to frame 62 through bimetallic springs 63 and 64, which function the same as do bimetallic springs 11 and 12 of Figure 1. Bimetallic springs 11 and 12 of Figure 3 function the same as they do in Figure 1, although their relative position with respect to the panel is different. That is, one is on each side of the panel, instead of both being on the same side. Since frame 62 is designed for placement upon the surface of the earth, the sun cannot shine from the rear null direction, and solar cells 46 will always face the sun. Thus, a ratchet ring is not necessary and shields 71, 72, 73 and 74 do not need rear-null-position sides such as sides 31 and 35 of Figure 1.

Figure 4:
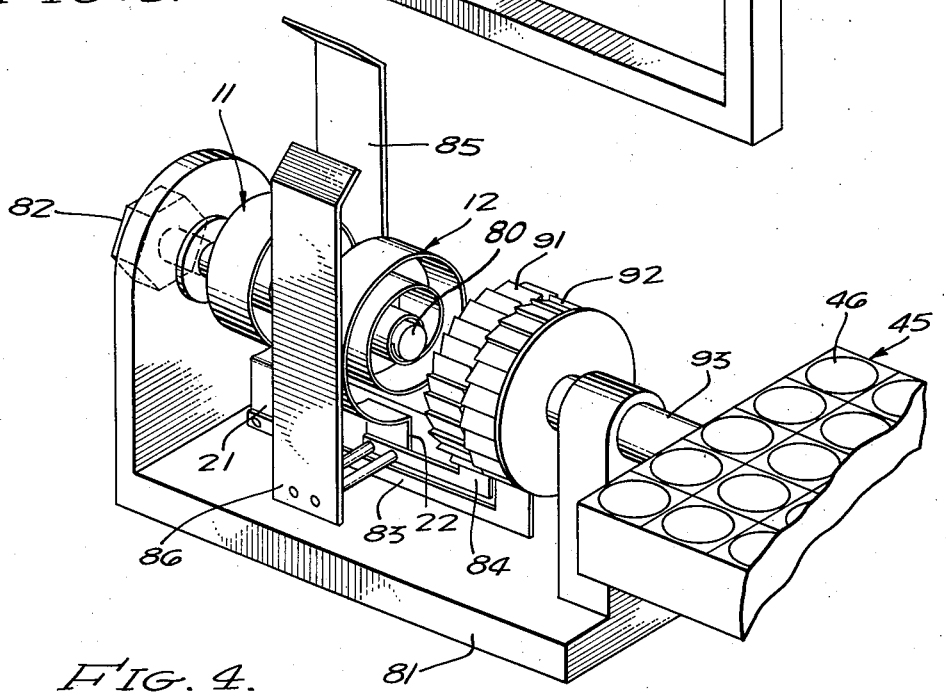
Figure 4 is an isometric view of a third embodiment of the present invention.

Figure 4 shows a third embodiment of the sun-tracking servomechanism of the present invention. Shaft 80 is immovably connected to chassis 81 by nut 82. End 21 of bimetallic spring 11 is connected to pawl 83. End 22 of bimetallic spring 12 is connected to pawl 84. End 21 is connected to shield 85 and end 22 is connected to shield 86. Ratchet wheels 91 and 92 are mounted upon axle 93, which is supported by chassis 81. Ratchet wheels 91 and 92 overrun in opposite directions, and since bimetallic springs 11 and 12 are oppositely wound about shaft 80, when bimetallic spring 11 contracts, pawl 83 will rotate ratchet wheel 92 in one direction, while when bimetallic spring 12 contracts, pawl 84 will rotate ratchet wheel 91 in the opposite direction. Thus, panel 45 and solar cells 46, being mounted on axle 93, will be caused to track the sun.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim as my invention is:

1. A servomechanism for tracking a heat source, comprising: a shaft; first and second bimetallic springs, each having two ends, each being fastened at one of its ends to said shaft, and each being spiraled about said shaft in opposite directions; a base mount, the ends of said springs that are not fastened to said shaft being fastened to said base mount, said springs being the sole support of said shaft; first and second shields coupled to said first and second springs, respectively, neither of said shields casting a shadow upon either of said springs when the sun is, with respect to said springs, in a front null position in which said springs are equally exposed to said sun, said first shield casting a shadow upon said first spring when said sun is in a position on one side of said front null position, said second shield casting a shadow upon said second spring when the sun is in a position on the other side of said front null position, the extent of said shadows being proportional to the angular displacement of said sun with respect to said front null position, and said springs, when equally exposed to said sun, exerting equal forces in opposite directions upon said shaft, and, when unequally exposed to said sun, exerting unequal forces in opposite directions upon said shaft, thereby moving said shaft until said springs are equally exposed to said sun; a panel of solar cells mounted upon said shaft and oriented so that said solar cells face said sun when said springs are equally exposed to said sun; a third bimetallic spring having two ends, one end thereof being fastened to said shaft, the other end thereof making forceful contact with said base mount whereby expansion of said third spring moves said shaft when said third spring is heated; and a container enclosing said third bimetallic spring and allowing it to be exposed to said sun only when said sun is positioned in a rear null position 180° out of space phase with said front null position.

2. Apparatus for tracking a heat source, comprising: first means; second and third means, said first means being supported solely by said second and third means, said second and third means being resilient and responsive to energy from a heat source so as to exert equal forces in opposite directions, respectively, upon said first means when said second and third means are equally exposed to the energy from said heat source, and said second and third means exerting unequal forces in opposite directions upon said first means when said second and third means are unequally exposed to the energy from said heat source, thereby moving said first means to a position where said second and third means are equally exposed to energy from said heat source and said first means is positioned with a predetermined desired relationship to said source; and fourth means supporting said second and third means.

3. A servomechanism for tracking a heat source, comprising: first means; second and third resilient means responsive to energy from a heat source and having a front null position in which they are equally heated by said energy; a fourth means connected to said second and third means for support; a first shield for casting a shadow upon said second means when the heat source is in a position on one side of said front null position; and a second shield for casting a shadow upon said third means when the heat source is in a position on the other side of said front null position, the extent of said shadows being porportional to the angular displacement of said heat source with respect to said front null position, said second and third means, when equally exposed to said heat source, exerting equal forces in opposite directions upon said first means, and when unequally exposed to the heat source exerting unequal forces in opposite directions upon said first means, thereby orienting said first means until said second and third means are equally exposed to energy from said source.

4. A servomechanism for tracking a heat source, comprising: first means; second and third means responsive to energy from a heat source and having a front null position in which they are equally heated by said energy, said second and third means comprising bimetallic strips wound about said first means in opposite directions; a fourth means connected to said second and third means for support; a first shield for casting a shadow upon said second means when the heat source is in a position on one side of said front null position; and a second shield for casting a shadow upon said third means when the heat source is in a position on the other side of said front null position, the extent of said shadows being proportional to the angular displacement of said heat source with respect to said front null position, said second and third means, when equally exposed to said heat source, exerting equal forces in opposite directions upon said first means, and when unequally exposed to the heat source exerting unequal forces in opposite directions upon said first means, thereby orienting said first means until said second and third means are equally exposed to energy from said source.

5. A servomechanism as defined in claim 4 in which said first means is supported solely by said second and third means.

6. A servomechanism for tracking a heat source, comprising: first means; second and third means responsive to energy from a heat source and having a front null position in which they are equally heated by said energy; a fourth means connected to said second and third means for support; a first shield for casting a shadow upon said second means when the heat source is in a position on one side of said front null position; a second shield for casting a shadow upon said third means when the heat source is in a position on the other side of said front null position, the extent of said shadows being proportional to the angu- lar displacement of said heat source with respect to said front null position, said second and third means, when equally exposed to said heat source, exerting equal forces in opposite directions upon said first means, and when unequally exposed to the heat source exerting unequal forces in opposite directions upon said first means, thereby orienting said first means until said second and third means are equally exposed to energy from said source; fifth means; and sixth means, said fifth means enclosing said sixth means and allowing said sixth means to receive a substantial amount of energy from said heat source only when said heat source is positioned in a rear null position 180° out of space phase with said front null position, and said sixth means being responsive to energy from said heat source to move said first means.

7. A servomechanism as defined in claim 6 in which said sixth means comprises a bimetallic strip having two ends, one end thereof being connected to said first means, the other end thereof making contact with, and exerting a force against, said fourth means when said bimetallic strip expands.

8. A plurality of servomechanisms for tracking a heat source, each of said plurality of servomechanisms comprising: first means; second and third means responsive to energy from a heat source and having a front null position in which they are equally heated by said energy; fourth means connected to said second and third means for support, said fourth means of one of said plurality of servomechanisms also being the first means of another of said plurality so that said plurality of servomechanisms can track the heat source with a plurality of degrees of freedom; a first shield for casting a shadow upon said second means when said heat source is in a position on one side of said front null position; and a second shield for casting a shadow upon said third means when said heat source is in a position on the other side of said front null position, the extent of said shadows being proportional to the angular displacement of said heat source with respect to said front null position, said second and third means, when equally exposed to said heat source, exerting equal forces in opposite directions upon said first means, and when unequally exposed to said heat source exerting unequal forces in opposite directions upon said first means, thereby orienting said first means until said second and third means are equally exposed to energy from said source.

9. A servomechanism for tracking a heat source, comprising: first means; second and third means responsive to energy from a heat source and having a front null position in which they are equally heated by said energy, said second means comprising a first bimetallic strip and a first pawl connected to one end of said first bimetallic strip, and said third means comprising a second bimetallic strip and a second pawl connected to one end of said second bimetallic strip; fourth means connected to said second and third means for support, said first and second bimetallic strips being spiraled about said fourth means in opposite directions, said first means also being supported by said fourth means and comprising a shaft having first and second ratchet wheels oppositely mounted thereon and positioned so that said first pawl can engage said first ratchet wheel and move said shaft in one direction and said second pawl can engage said second ratchet wheel and move said shaft in the opposite direction, said second pawl being able to overrun said second ratchet wheel when said first pawl is engaged, and said first pawl being able to overrun said first ratchet wheel when said second pawl is engaged; a first shield for casting a shadow upon said second means when said heat source is in a position on one side of said front null position; and a second shield for casting a shadow upon said third means when said heat source is in a position on the other side of said front null position, the extent of said shadows being proportional to the angular displacement of said heat source with respect to said front null position, said second and third means, when equally exposed to said heat source, exerting equal forces in opposite directions upon said first means, and when unequally exposed to said heat source exerting unequal forces in opposite directions upon said first means, thereby orienting said first means until said second and third means are equally exposed to energy from said source.

10. A servomechanism for tracking a heat source, comprising: first means; second and third means responsive to energy from a heat source and having a front null position in which they are equally heated by said energy, said second means comprising a first bimetallic strip and a first engagement link connected to one end of said first bimetallic strip, and said third means comprising a second bimetallic strip and a second engagement link connected to one end of said second bimetallic strip; fourth means connected to said second and third means for support, said first and second bimetallic strips being spiraled about said fourth means in opposite directions, said first means also being supported by said fourth means and comprising a shaft having first and second over-running clutches oppositely mounted thereon and positioned so that said first engagement link can engage said first over-running clutch and move said shaft in one direction and said second engagement link can engage said second over-running clutch and move said shaft in the opposite direction; a first shield for casting a shadow upon said second means when said heat source is in a position on one side of said front null position; and a second shield for casting a shadow upon said third means when said heat source is in a position on the other side of said front null position, the extent of said shadows being proportional to the angular displacement of said heat source with respect to said front null position, said second and third means, when equally exposed to said heat source, exerting equal forces in opposite directions upon said first means, and when unequally exposed to said heat source exerting unequal forces in opposite directions upon said first means, thereby orienting said first means until said second and third means are equally exposed to energy from said source.

References Cited in the file of this patent

UNITED STATES PATENTS 2,155,402　　Clark ------------------ Apr. 25, 1939